US005696174A

United States Patent [19]

Chao et al.

[11] Patent Number: 5,696,174
[45] Date of Patent: Dec. 9, 1997

[54] STABLE AND WATER-RESISTANT AQUEOUS FOAM COMPOSITION

[75] Inventors: Yen-Yau H. Chao, Harleysville, Pa.; Kuei-Jung Chao, Hsinchu, Taiwan

[73] Assignee: Allied Foam Tech Corporation, Harleysville, Pa.

[21] Appl. No.: 760,345

[22] Filed: Dec. 4, 1996

Related U.S. Application Data

[63] Continuation of Ser. No. 389,572, Feb. 14, 1995, abandoned.

[51] Int. Cl.$^6$ ................ C11D 1/18; C08J 9/00
[52] U.S. Cl. ............ 521/50; 252/173; 252/544; 252/545; 252/546; 252/547; 252/550; 252/552; 252/553; 252/554; 521/56; 521/65; 521/69; 521/72; 521/108; 521/109.1; 521/118; 521/121; 521/124; 521/125; 521/128; 521/129
[58] Field of Search ................ 521/50, 56, 65, 521/69, 72, 108, 109.1, 118, 121, 124, 125, 128, 129; 252/544, 545, 546, 547, 550, 552, 553, 554, 173

[56] References Cited

U.S. PATENT DOCUMENTS

| 3,329,609 | 7/1967 | Blomfield. |
|---|---|---|
| 3,920,565 | 11/1975 | Morton. |
| 3,997,453 | 12/1976 | Wixon. |
| 4,061,001 | 12/1977 | von der Eltz et al.. |
| 4,098,944 | 7/1978 | Pollock. |
| 4,173,539 | 11/1979 | Rule et al.. |
| 4,184,914 | 1/1980 | Jenkins. |
| 4,230,746 | 10/1980 | Nahta. |
| 4,300,633 | 11/1981 | Stewart. |
| 4,307,197 | 12/1981 | Daniel et al.. |
| 4,310,996 | 1/1982 | Mulvey et al.. |
| 4,347,145 | 8/1982 | Gregorian et al.. |
| 4,349,930 | 9/1982 | Van Wersch et al.. |
| 4,555,284 | 11/1985 | Quella et al.. |
| 4,571,360 | 2/1986 | Brown et al.. |
| 4,581,254 | 4/1986 | Cunningham et al.. |
| 4,597,831 | 7/1986 | Anderson. |
| 4,721,759 | 1/1988 | Tanaka. |
| 4,863,788 | 9/1989 | Bellairs et al.. |
| 4,872,913 | 10/1989 | Dunton et al.. |
| 4,899,498 | 2/1990 | Grieb. |
| 4,918,112 | 4/1990 | Roox. |
| 5,118,557 | 6/1992 | Barnewall. |
| 5,141,363 | 8/1992 | Stephens. |
| 5,230,191 | 7/1993 | Mayrand. |
| 5,314,530 | 5/1994 | Wierer et al.. |
| 5,324,590 | 6/1994 | Nylund et al.. |
| 5,342,858 | 8/1994 | Litchholt et al.. |
| 5,346,567 | 9/1994 | Barnewall. |

FOREIGN PATENT DOCUMENTS

| 0 011 333 | 5/1980 | European Pat. Off.. |
|---|---|---|
| 2548242A1 | 5/1976 | Germany. |
| 2941584 | 4/1980 | Germany. |
| WO 84/00921 | 3/1984 | WIPO. |

OTHER PUBLICATIONS

F. Sebba, "Breaking Foams Produced by Ionic Surfactants," *Nature*, vol. 197, No. 4873, Mar. 1963, p. 1195.

Shibata et al., "Monolayers of Double Long–Chain Salts," *J. of Colloid & Interface Science*, vol. 77, No. 1, Sep. 1980, p. 182.

F. Sebba, *Foams and Biliquid Foams—Aphrons*, J. Wiley & Sons Pub., 1987, p. 61.

Stellner et al., "Precipitation Phenomena in Mixtures of Anionic and Cationic Surfactants in Aqueous Solutions," *J. of Colloid & Interface Science*, vol. 123, No. 1, May 1988, p. 186.

PCT Search Report, mailed Jul. 29, 1996.

*Primary Examiner*—James J. Seidleck
*Assistant Examiner*—John M. Cooney, Jr.
*Attorney, Agent, or Firm*—Ratner & Prestia

[57] ABSTRACT

Stable and water-resistant aqueous foam composition containing (1) a long chain cationic organic compound and (2) a long-chain anionic organic compound in a weight ratio of from 0.05:1 to 15:1. The stable foam composition of the invention may be mixed with various water-soluble or water-dispersible organic, polymeric, or inorganic substances and used in applications where lightweight, heat, sound or other insulative, barrier properties or homogeneous material distribution are needed. Such applications include cementitious or gypsum containing substances, adhesives, binders, paper treating materials, coatings, ceramics, landfills, geofills, and firefighting and fireproofing materials.

33 Claims, No Drawings

STABLE AND WATER-RESISTANT AQUEOUS FOAM COMPOSITION

This application is a continuation of application Ser. No. 08/389,572 filed Feb. 14, 1995 which is now abandoned.

FIELD OF THE INVENTION

This invention relates to foam compositions and, more particularly, to stable and water-resistant, aqueous foam compositions, to processes for preparing them, and to applications for using them.

BACKGROUND OF THE INVENTION

Aqueous foams containing foaming reagents and various organic, polymeric, or inorganic substances have been used in applications where one or more of the following are desired: reduced weight, reduced material consumption, homogeneous material distribution, and ease of processing. Aqueous foams are also useful in products serving as barriers against sound, temperature, particulates, or odor. Examples of applications in which foams are used include construction materials, firefighting foams, fireproof coatings, foamed adhesives, surface coatings, paper and textile treatment materials, lightweight ceramics, lightweight landfills, geofills, and dust barriers. In most of these applications, stable foams with fine pore size are required.

A well-known problem with aqueous foams in general, however, is that they have limited foam stability. This is believed to be due at least in part to liquid drainage from the wall of the air bubbles. Attempts have been made to improve the stability and consistency of foams by the addition of fatty amines to aqueous anionic or amphteric surfactants from which a foam is formed. Such foam compositions, however, along with all other known foam compositions, fail to provide adequate stability for many applications.

Most of the aqueous foams are also known to redisperse readily in water, i.e. the lack of water resistance.

It is therefore an object of the present invention to provide a stable and water-resistant, aqueous foam composition. It is also an object of the present invention to provide a process of preparing such a foam composition. It is also an object of the present invention to provide various uses and applications for such a foam composition.

SUMMARY OF INVENTION

The present invention provides a foam composition formed of a long-chain organic cation-forming compound having the general formula (I):

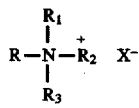

where R is an aliphatic hydrocarbon radical having from 8 to 24 carbon atoms; $R_1$ is selected from the group consisting of an alkyl group having from 1–16 carbon atoms, a hydroxyalkyl group having from 1–16 carbon atoms, a benzyl group, a group which, when taken together with the nitrogen, represents a heterocyclic radical, and any of such groups having a hydrogen atom replaced by a fluorine atom; $R_2$ and $R_3$ are selected from the group consisting of an alkyl group having from 1–6 carbon atoms, a hydroxyalkyl group having from 1–6 carbon atoms, a benzyl group, a hydrogen atom, a group which, when taken together with the nitrogen, represents a heterocyclic radical, and any of such groups having a hydrogen atom replaced by a fluorine atom; and $X^-$ is an anionic counter ion; and a long-chain organic anion-forming compound having the formula (II):

where $R'$ is an aliphatic hydrocarbon radical with 10 to 24 carbon atoms; $X_2^-$ is an anionic group selected from the group consisting of carboxylate, sulfate, sulfonate, and phosphate; and $Y^+$ is a cationic counter ion selected from the group consisting of ammonium, sodium, and potassium salt;

wherein the long-chain organic cation formed from (I) and the long-chain organic anion formed from (II) are present in a weight ratio of from 0.05:1 to 15:1.

The present invention further provides a process of preparing a foam by generating a preformed foam from a liquid long-chain organic cation-forming compound having the general formula (I), as given above, or a liquid long-chain organic anion-forming compound having the general formula (II), as given above; adding to the preformed foam the other of the liquid long-chain organic cation-forming compound or the long-chain organic anion-forming compound, such that the long-chain organic cation formed from (I) and the long-chain organic anion formed from (II) are present in a weight ratio of from 0.05:1 to 15:1; and generating a single foam from the preformed foam and the liquid that is added.

The present invention further provides applications in which the stable foam of the invention is used. These applications include foamed coatings; inks; adhesive materials; pre-cast or cast-in-place construction materials including cementitious and gypsum materials such as blocks, boards, panels, roofdecks, and flooring; barrier materials including landfill covers, odor barriers, and dust covers; paper, textile, and wood treating products; ceramic products; firefighting and fireproofing foams; and void fill such as geofill, soil stabilizers, oil well fill, and tunnel fill.

The foam composition of the present invention may optionally contain, by weight, 0 to 10% of foaming reagents, 0 to 80% inorganic additive, 0 to 80% water-soluble or water-dispersible organic or polymeric additive, and 0 to 99.8% water.

The cation-forming organic compounds of this invention are cationic with long-chains (with equal or greater than 8 carbons), and the anion forming organic compounds of this invention are anion with long chains (with equal or greater than 8 carbons).

The additional additives of this invention include inert fillers, aggregates, clay, sand, fibers, pigments, dyes, polymeric cement binder, plasticizers, superplasticizers, mineral wool, scrim, cement accelerators and retarders, freeze-preventing additives, and hydraulically hardenable materials such as cement, concrete, and gypsum.

The water-soluble, or water-dispersible, organic materials are thickeners, water-soluble polymers or water-dispersible polymers with glass transition temperatures from −85° C. to +80° C., pigments, dyes, sizing agents, and others. The foaming reagents of this invention include charged or non-charged surfactants or emulsifiers.

The foam compositions of this invention are preferably prepared by first foaming an aqueous mixture containing one of the charge-forming long-chain organic compounds, and then adding, under mixing, a second liquid containing (opposite) charge-forming long-chain organic compounds.

DETAILED DESCRIPTION OF THE INVENTION

In accordance with the present invention, there are provided foam compositions with excellent stability and water resistance. These compositions have a long-chain cation formed from a cation-forming organic compound, or a mixture of long-chain cation-forming organic compounds, and a long-chain anion formed from an anion-forming organic compound, or a mixture of long-chain anion forming organic compounds, present in a weight ratio of from 0.05:1 to 15:1. This weight ratio range typically encompasses a normality ratio range for the compounds of from 0.1:1 to 10:1, where normality is the molar concentration divided by the number of effective charges present in the individual, charged species. The weight ratio is particularly useful in determining the appropriate amounts of the respective components in embodiments wherein mixed anions and mixed cations are used because the normality ratio is more difficult to determine.

The long-chain cation-forming organic compounds of the present invention are to be found in the class

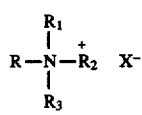  (I)

where R is an aliphatic hydrocarbon radical having from 8 to 24 carbon atoms, and $R_1$ is an alkyl or hydroxyalkyl group having from 1–16 carbon atoms or a benzyl group. $R_2$ and $R_3$ are H atoms for an amine, or only one of the $R_2$ and $R_3$ is H atom for a tertiary amine. For the quaternary ammonium salt, $R_2$ and $R_3$ are alkyl or hydroxyalkyl groups having from 1–6 carbon atoms or a benzyl group, or $R_2$ is taken together with the nitrogen and represents a heterocyclic radical. $X^-$ is an anion.

A particularly useful cation-forming compound of this invention has the general formula given above where R is a straight chain aliphatic hydrocarbon group having 12 to 24 carbon atoms, and either (a) all the $R_1$, $R_2$, and $R_3$ are alkyl or hydroxyalkyl groups having from 1–6 carbon atoms or a benzyl group, or (b) one of the $R_1$, $R_2$, and $R_3$ taken together with the nitrogen atom represents a heterocyclic radical, and any remaining group R is an alkyl or hydroxyalkyl group having from 1–6 carbon atoms, or a benzyl group, and $X^-$ is an anion that can be a halide or methosulphate. An anion can carry a double charge, as with sulphate, and in such an instance, $X^-$ represents half a unit group.

Particularly useful are compositions in which the quaternary ammonium salt, which is the general formula shown above, is a $C_{12}$ to $C_{22}$ alkyl trialkylammonium salt, especially where the latter alkyl groups are each methyl. Mixtures of quaternary ammonium salts can be used.

Specific examples of suitable quaternary ammonium salts are dodecyltrimethylammonium bromide (or chloride), tetradecyltrimethylammonium bromide (or chloride), hexadecyltrimethylammonium bromide (or chloride), octadecyltrimethylammonium bromide (or chloride), cetyltrimethylammonium bromide (or chloride), cetylbenzyldimethylammonium chloride, cetyltriethylammmonium bromide, and mixtures thereof.

Another particularly useful class of quaternary ammonium compounds according to the present invention corresponds to the general formula given above, where R is a straight chain aliphatic group of from 12 to 22 carbon atoms, $R_1$, $R_2$, and $R_3$ are methyl groups, and $X^-$ is a halogen, such as bromide. Any one or all of the hydrogen atoms in this embodiment, as well as in other embodiments, may be replaced by a fluorine atom to provide lower surface tension and better flame resistance in fire fighting applications.

The long-chain anion-forming organic compounds of the present invention are to be found in the class of $R'—X_2^-Y^+$  (II)

The anion $R'—X_2^-$ can be a water-soluble or water-dispersable alkali metal salt of an organic acid having an aliphatic hydrocarbon radical with from 12 to 24 carbon atoms, especially a sodium or potassium salt or a corresponding ammonium or substituted ammonium salt. The organic polar group $X_2^-$ of the anion can be carboxylate, sulphate, or sulphonate. Examples of suitable anions are carboxylates having from 12 to 24 carbon atoms. These include, for example, myristic, palmitic, stearic, oleic, and behenic acid anions, especially those of the anions derived from the soaps through splitting triglyceride oils. These include, for example, tallow fatty acid anion, which is a mixture of fatty acid anions consisting mainly of palmitate, stearate, and oleate. Other suitable fatty acid anions are provided by commercial soaps based upon mixtures of fatty acids obtained from natural sources such as tallow, coconut oil, and palm kernel oil. Synthetically manufactured soaps that simulate the fatty acids of natural sources are all suitable. Other sulphonic and sulphuric acids that provide suitable anions are described in U.S. Pat. No. 4,173,539 issued to Rule et al, which is incorporated herein for its teaching on sulphonic and sulphuric acids providing anions.

The effectiveness of combining oppositely charged cationic and anionic compounds to obtain a stable foam is completely unexpected. Those skilled in the art of foam preparation, before the disclosure of the present invention, would have believed such a combination to be destructive of foam stability. In Felix Sebba, *Foams and Biliquid Foams—Aphrons*, at 61 (John Wiley & Sons Ltd., 1987), the author states that "foams stabilized by charged surfactants can be broken if contacted by a foam produced using an oppositely charged surfactant." The reference states that all that is required to destroy a foam is to generate a foam with the oppositely charged surfactant and place it on the foam to be destroyed. The destruction of foams by such contact with oppositely charged foams is reported to be quite spectacular.

It is also reported in 197 Nature 4873, at 1195, that after foam collapse resulting from the contact of oppositely charged foams, the remaining water substrate containing the mixed surfactants shows no tendency to foam. This suggests that the surfactant from the collapsed foam does not re-enter the water in an active form. The stable foam produced by combining oppositely charged compounds according to the present invention, as disclosed herein, is thus quite unexpected.

The composition of this invention may contain up to 10% by weight of a foaming agent. The foaming agent can be charged or uncharged. An exemplary foaming agent is a nonionic surfactant, such as one selected from the group consisting of (1) the condensation product of 1 mole of alkylphenol wherein the alkyl chain contains from 8 to about 18 carbon atoms with from about 1 to about 100 moles of ethylene oxide (an example of which is Triton X-405 sold by Union Carbide); (2) the condensation product of 1 mole of an aliphatic alcohol wherein the alkyl chain contains from 10 to about 24 carbon atoms with from about 1 to about 100 moles of ethylene oxide (examples of which are the Tergitol line of products from Union Carbide).

The composition of the invention may contain water-soluble or water-dispersable polymers up to 80% by weight. The polymer may be prepared by any well known polymerization technique, such as, for example suspension, emulsion dispersion, or solution polymerization. Aqueous emulsion polymerization techniques suitable for use in the present invention are discussed in detail in D. C. Blackley, *Emulsion Polymerization* (Wiley, 1975), which is incorporated herein for its teaching on aqueous emulsion polymerization techniques.

The polymers can be dispersions of polyurethane, polyacrylic copolymers, ethylenevinylacetate copolymers, synthetic and natural rubber emulsions, polyisocyanate dispersions, aqueous ureaformaldehyde solutions, etc. The aqueous polymers may optionally contain ionic functional groups that can assist the further stability of the foam of this invention containing the oppositely charged long-chain organic species.

In the preparation of the composition of this invention containing polymer with ionic functional groups, the polymer is preferably mixed either with the cationic long-chain organic species or with the anionic long-chain organic species before foaming. The polymer may also be post-added after the formation of the foam of the invention.

Usually with the presence of the charged polymeric species, the foam composition of this invention will have greater stability and viscosity. Such compositions, upon mixing with different organic or inorganic additives such as sizing agents, dyes, fillers, and hydraulic substances, will find application in very stable and lightweight cementitious or gypsum-type substrates, paper and textile treating materials, foamed coatings, and adhesives and other binders.

The glass transition temperature of the polymers in the composition of the invention is from −85° C. to 80° C. Because the glass transition temperature of the polymer is greater than room temperature, the composition of the invention may optionally contain coalescent or co-solvent known in the art to facilitate film formation.

The composition of this invention may be prepared by first foaming an aqueous solution containing one type of charged long-chain organic compound and other polymeric or inorganic additives mentioned above. The second solution containing the long chain organic compound of the opposite charge is then added in a concentrated liquid form, under mixing, to the foamed mixture of the first composition. The composition of this invention can also be foamed, however, as one pot with pre-mixed long-chain cationic species and long-chain anionic species, and an efficient foam generator such as Ease-E-Foamers from Ease, Inc. or a Texacote foamer.

In preparing the foam composition of this invention continuously on a job site or in a manufacturing plant, a liquid dosing, metering or delivering pump may be used to add the second and oppositely charged long-chain organic compound in liquid form to the foam generated from a compressed air and liquid mixture containing the first charged long-chain organic compound. The first long-chain charged organic component may first be pumped through a mixing tee where compressed air is mixed in. The air-liquid mixture may then converted to foam by passing through a mixing column filled with saddle chips. At a second mixing tee the oppositely charged long-chain organic compound may then be fed as a liquid through a metering or dosing pump and mixed with the preformed foam containing the first long-chain charged organic compound. The final foam passes through a second mixing column and exits as a single, completely mixed foam through an end pipe. Pigments or other colorants may be added into liquid of the oppositely charged long-chain organic compound that is added to the prefoam in order to monitor the mixing efficiency of the two charged streams in the final foam composition.

The composition of this invention may contain fillers such as clay, sand, various aggregates, fibers, hydraulically hardenable substances such as cement and gypsum, thickeners, cement accelerators, cement retarders, pigments, dyes, and freeze-preventing additives. Such additives may either be added before the foaming or post-blend with the preformed foams.

The composition of this invention containing hydraulic substances such as cement, concrete, or gypsum can be used as lightweight roofdecks, flooring, void-filling materials (to fill empty salt mines, strengthen foundations, and stabilize soils), landfill covers, and fireproof coatings. Higher density cementitious foams according to the present invention are less insulative, but their increased strength makes them useful as precast members, blocks, and panels for structural or semistructural applications.

The foamed hydraulic substances derived from conventional foaming reagents usually have severe foam collapse upon addition of polymeric modifiers such as water-dispersable acrylic or vinyl acetate-type polymeric latexes. The foam stability of the composition of the present invention is insensitive to the presence of the various polymeric modifiers present in the hydraulic substances. The hardened (cured) composition of the invention containing hydraulic substances and polymeric substances has much finer pore size, more homogeneous foam texture, improved water resistance, and better mechanical strengths than the foamed hydraulic substances derived from conventional foaming reagents with or without such additives.

The foam compositions of the present invention that contain water-soluble or water-dispersable polymeric substances such as polyurethanes, polyacrylic, vinylacrylic, or vinylacetate latexes, all having a glass transition temperature from −85° C. to +80° C., have excellent foam stability and fine pore size. In addition, unlike the foams from conventional foaming agents, the foam characteristics of the composition of the invention are unaffected by many organic and inorganic additives. This allows the use of different polymeric substances and various organic and inorganic fillers of interest in the foam composition of the invention in order to provide desired insulative and process properties in coatings, adhesive binders, paper and textile treating materials, and carpet backings.

The foam composition of the present invention, with its good foam stability and insensitivity to different fillers, such as clays, soils, or hydraulic substances, is ideal for landfill covers and odor barriers in septic or hazardous waste applications.

The foam composition of the present invention containing non-flammable inert fillers such as clay can resist high temperature flames without serious foam collapse. This makes the foam useful as a firefighting foam or a fireproof coating, or as a raw material used to make lightweight firebricks or lightweight ceramic materials.

EXAMPLES 1–6

The foam compositions of Examples 1–3 were prepared by adding Component Two: a long chain anion-forming organic compound—ammonium stearate in liquid form—to Component One: a preformed foam containing various long-chain cation-forming organic compounds. Comparative Examples 4–6 were prepared by foaming Component One only.

The foamed compositions were made by adding at least 100 grams of Component One into a five quart stainless steel bowl. The content was whipped on a ten speed Hobart blender (Kitchen Aid brand) until a low density foam having a density of 0.03–0.08 g/cc was obtained. This usually took one to three minutes. If Component Two was added (Examples 1–3), then Component Two in liquid form was added onto the preformed foam of Component One under mixing. The mixing was continued until a homogeneous foam mix (a complete mix) was obtained. This took one to two minutes. The final foam was cast into a plastic or paper cup and the amount of foam collapse after a measured period of time was expressed as % foam collapse. Foam collapse was measured by dividing the total volume of foam present immediately after foam preparation, less the volume of foam present at the end of the time period, by the volume of the foam present immediately after foam preparation. The results are presented in Table 1.

Table 1 shows that three hours after foam preparation no foam collapse was observed and the foam was not dissolved in water for Examples 1–3, which contained both the long-chain cationic organic compound and the long-chain anionic organic compound. Comparative Examples 4–6 showed greater than 50% foam collapse three hours after foam preparation. The foam of Examples 4–6 dissolved in water in less than an hour upon contact with water when the foam compositions contained only the long-chain cationic organic component.

TABLE 1

|  | Composition in parts by weight Example: | | | | | |
|---|---|---|---|---|---|---|
|  | 1 | 2 | 3 | 4 | 5 (comparative) | 6 |
| Component One (preformed foam) | | | | | | |
| tetradecyltrimethylammonium bromide | 0.5 | | | 0.5 | | |
| hexadecyltrimethylammonium chloride | | 0.7 | | | 0.7 | |
| Arquad T (29%) | | | 2.5 | | | 2.5 |
| Triton X-405 (70%) | 0.5 | | 0.7 | 0.5 | 0.7 | 0.5 |
| water | 100 | 100 | 100 | 100 | 100 | 100 |
| Component Two (liquid form) | | | | | | |
| ammonium stearate (33%) | 1.5 | 1.5 | 1.5 | — | — | — |
| Performance | | | | | | |
| foam on water for 3 hours | fine | fine | fine | dissolved | dissolved | dissolved |
| % foam collapse in 3 hours | 0 | 0 | 0 | >50 | >50 | >50 |

Arquad T is a tallowalkyl trimethyl ammonium chloride from Akzo Nobel Chemicals Corporation
Triton X-405 is a nonionic surfactant from Union Carbide Corporation

EXAMPLES 7–10

The foam coating compositions of Examples 7 and 8 were prepared following the procedure of Examples 1–3. Examples 7 and 8 contained polymer latexes and both had long-chain cationic organic species and long-chain anionic organic species in the foam composition. Comparative Examples 9 and 10 were prepared following the procedures of Examples 4–6 and contained polymer latexes and long-chain cationic organic species only. The foamed coatings were brushed on card boards and the coating weight (wet) per unit area was measured and presented in Table II. The foam collapse on the cardboard was estimated at particular time intervals for all the examples. The tackiness of Examples 8 and 10 (which contain a latex polymer with low glass transition temperature) after 24 hours was judged by pressing a thumb lightly on the coated board. Examples 7 and 8 showed no foam collapse even 24 hours after the foam was coated on the cardboard. Example 8 also showed tackiness that indicated that the polymer was not absorbed into the board because of the non-collapsed foam. Comparative Examples 9 and 10 showed that more than 80% of the foam collapsed 20 minutes after the coating was applied on the cardboard. Example 10 also lost tackiness completely, the indication of very little polymer retained on the surface of the cardboard.

TABLE II

|  | Composition in parts by weight Example: | | | |
|---|---|---|---|---|
|  | 7 | 8 | 9 | 10 (comparative) |
| Foamed Compositon One | | | | |
| Airflex 320 polymer latex | 25 | | 25 | |
| Airflex 465 polymer latex | | 25 | | 25 |
| Arquad T | 7.5 | 7.5 | 7.5 | 7.5 |
| Triton X-405 (70%) | 0.63 | 0.63 | 0.63 | 0.63 |
| Hydroxyethyl cellulose thickener | 0.13 | 0.13 | 0.13 | 0.13 |
| water | 100 | 100 | 100 | 100 |
| Liquid Additive Two | | | | |
| ammonium stearate (33%) | 4.4 | 4.4 | — | — |
| Performance on card board | | | | |
| Coating wt. on the cardboard (mg/cm²) | 5 | 6 | 6 | 5 |
| % foam collapse | | | | |
| 20 minutes after coating | 0 | 0 | >80 | >80 |
| 24 hours after coating | 0 | 0 | 100 | 100 |
| tackiness | | | | |
| 24 hours after coating | — | yes | — | no |

Airflex 320 is vinylacetate ethylene copolymer latex from Air Products, the polymer has a glass transition temperature of 14° C.
Airflex 465 is vinylacetate ethylene copolymer latex from Air Products, the polymer has a glass transition temperature of −5° C.
Triton X-405 is a nonionic surfactant from Union Carbide Corporation.

EXAMPLES 11–14

Foamed Composition of the Invention with High (>1) Cation/Anion Weight Ratios Examples 11–13 were prepared at high concentrations of cationic compound and low concentrations of anionic compound. The foams of these examples were composed of a preformed foam of long-chain cation-forming compound as Component One and an added liquid long-chain anion-forming compound as Component Two, prepared in accordance with the procedure in Examples 1–3. Comparative Example 14 was a foam prepared from the long-chain cation-forming compound only. All the foams were evaluated for % foam collapse 2.5 hours after preparation. The results are given in Table III. Examples 11–13 in Table III show that at cation/anion weight ratios of 14.7 to 2.8, the % foam collapse after 2.5 hours was 20% or less. Comparative Example 14, containing only the cationic compound, had greater than 80% foam collapse.

TABLE III

| | Composition in parts by weight Example: | | | |
|---|---|---|---|---|
| | 11 | 12 | 13 | 14 (comparative) |
| Component One (preformed foam) | | | | |
| hexadecyltrimethylammonium chloride (29%) | 10 | 10 | 10 | 10 |
| water | 100 | 100 | 100 | 100 |
| Component Two (liquid) | | | | |
| ammonium stearate (33%) | 0.6 | 1.7 | 3.2 | 0 |
| Cation/Anion Ratio (by weight) | 14.7 | 5.2 | 2.8 | — |
| Performance | | | | |
| % foam collapse in 2.5 hours | 20 | 7 | 2 | >80 |

EXAMPLES 15–18

Foamed Composition of the Invention with Low (<1) Cation/Anion Ratios

Examples 15–17 were prepared at low concentrations of cation-forming compound and high concentrations of anion-forming compound. All the foams of these examples were composed of a preformed foam of long-chain anion-forming compound as Component One and an added liquid long-chain cation-forming compound as Component Two, prepared by the procedure of Examples 1–3. Comparative Example 18 was a foam prepared from the long-chain anion-forming compound only. All the foams were evaluated for % foam collapse and % (by weight) dewatering 2.5 hours after preparation. The % dewatering was evaluated by dividing the weight of liquid drained, after a certain time, from the container having the foam in it (obtained by tilting the container), by the total weight of the foam and liquid before draining. The results are given in Table IV. Examples 15–17 in Table IV, having cation/anion weight ratios of 0.1–0.5, had 2% or less foam collapse and 28% or less dewatering at 2.5 hours after preparation. Comparative Example 18, containing only the anionic compound, had 8% foam collapse and 41% dewatering.

TABLE IV

| | Composition in parts by weight Example: | | | |
|---|---|---|---|---|
| | 15 | 16 | 17 | 18 (comparative) |
| Component One (preformed foam) | | | | |
| ammonium stearate (33%) | 6 | 6 | 6 | 6 |
| water | 100 | 100 | 100 | 100 |
| Component Two (liquid) | | | | |
| hexadecyltrimethylammonium chloride (29%) | 0.8 | 1.6 | 3.3 | 0 |
| Cation/Anion Ratio (by weight) | 0.1 | 0.2 | 0.5 | — |
| Performance | | | | |
| % foam collapse in 2.5 hours | 2 | 0 | 0 | 8 |
| % dewatering in 2.5 hours | 28 | 0 | 0 | 41 |

EXAMPLE 19

Preparing the Foamed Composition of the Present Invention as a One Pot System In Examples 1–3 and 7–8, foams according to the present invention were prepared by adding Component Two in liquid form to a preformed foam of Component One. In this Example, a composition according to the present invention was foamed as one pot with three grams of Arquad T, 0.5 gram Triton X-405, 30 grams of Barden clay, 100 grams of water, and 2.5 grams of ammonium stearate. The mixture was foamed using a Hobart blender at speed ten for five minutes. A thick foam was formed with a density of 0.105 g/cc. The foam did not dissolve in water and showed no foam collapse 24 hours after foam preparation.

EXAMPLE 20

Foamed Coatings and Foamed Laminating Adhesives Compositions for Wood or Particle Boards Wood surfaces are, in general, very water absorbing, and aqueous wood coatings and adhesives usually have to be applied repeatedly to build enough polymeric materials on the wood surface for required applications. Conventional foamed coatings, such as Comparative Example 9 in Table II and foamed adhesives such as Comparative Example 10 in Table II, will have quick foam collapse upon application to the absorbing surfaces such as wood and particle board. The foamed coating (Example 7 in Table II) and the foamed adhesive (Example 8 in Table II) formed in accordance with the present invention have excellent foam stability on absorbing surfaces. In applications such as coatings for wood surfaces and laminating adhesives for particle boards, one or two coats of such materials allows enough polymeric materials of interest to be retained on the surface. This will be appreciated in material savings.

EXAMPLE 21

Foam Composition of the Invention Using a Potassium Salt of Fatty Acid Instead of an Ammonium Salt of Fatty Acid as the Anionic Organic Source In Examples 1–3 and Examples 7–8, the long-chain organic anion used was the ammonium salt of stearic acid.

In this example, an odorless potassium salt of stearic acid was used and stable foam was obtained. A preparation of 5.3% (by weight) of potassium salt of stearic acid was first prepared by heating 581 grams of water and 7.3 grams of potassium hydroxide to 70° C. Then 32.2 grams of a 90% pure stearic acid was added under stirring into the hot potassium hydroxide solution. A viscous and clear solution of 5.3% potassium salt of stearic acid was obtained. Then, 20 grams of the 5.3% solution of potassium stearate was added into a preformed foam that contained 100 grams water, 3.3 grams Arquad T, 0.67 grams of Triton X-405, and 33 grams Barden clay. A smooth and creamy clay foam with a density of 0.06 g/cc was obtained. The foam was odorless, and it did not show any foam collapse three hours after the foam preparation.

EXAMPLE 22

Foamed Gypsum Composition Containing Oppositely Charged Long-Chain Organic Compounds A foamed hydraulic composition containing gypsum was prepared by adding a gypsum slurry into a foam mixture containing oppositely charged long-chain organic compounds prepared following the procedure in Examples 1–3. The gypsum slurry consisted of 300 grams of plaster of Paris and 200 grams of water. The slurry was mixed with 50 grams of a foam mixture containing (1) a preformed foam of Component One with 1.2 parts (by weight) of hexadecyltrimethyl ammonium chloride, 0.5 parts of Triton X-405, and 100 parts of water, and (2) a liquid Component Two having three parts of ammonium stearate. The foamed gypsum had a wet density of 0.34 g/cc and it hardened in less than 24 hours with very fine pore size (average pore diameter was less than 0.1 cm).

EXAMPLE 23

Vertically Trowelable Cementitious Foam Containing Oppositely Charged Long-Chain Organic Compounds A foamed composition was prepared by the procedure of Examples 1–3 with (1) a foamed Component One containing 100 parts (by weight) of water, 67 parts of a vinylacetate ethylene latex Airflex 500 (Air Products), 10 parts of a long-chain cation-forming organic compound Arquad T (Akzo Nobel), and 0.83 parts Triton X-405 (Union Carbide), and (2) a liquid Component Two having 6.2 parts of ammonium stearate. Then, 18 grams of this foam mixture was added into a cement slurry comprising 100 grams white Portland cement Type I, 50 grams water, and 0.2 gram hydroxyethyl cellulose thickener (Sigma Chemical Company). The foamed cementitious slurry prepared as such was lightweight, viscous, and smooth. It had a wet density of 0.46 g/cc. The slurry, upon being troweled on a vertical wall at 1.3 cm thick, showed no sagging. This polymer-modified cementitious foam generated fair hardness in two days without any foam collapse and without any sagging.

EXAMPLE 24

A Landfill Cover

Long chain quaternary ammonium salts are well known for their anti-bacteria (germicidal) activity. In landfills the control or reduction of bacteria growth is a highly desirable feature and none of the known current soil or commercial foam covers have such capacities. The foam composition of this invention, having one of its two major components being long chain quaternary ammonium salt, is ideal to be used as landfill cover with built-in anti-bacteria capacity. Clay-containing foamed composition within the scope of this invention for landfill cover was prepared by adding 47 parts (by weight) of Barden clay to a foam mixture prepared by the procedure of Examples 1–3. The foam mixture contained (1) a Component One having 100 parts (by weight) of water, 1.5 parts of hexadecyltrimethyl ammonium chloride, and (2) a Component Two having six parts of ammonium stearate. The clay-containing foam was viscous and creamy with a wet density of 0.23 g/cc. The foam was poured over a synthetic pile of garbage consisted of foamed polystyrene chips of various sizes and shapes. The clay-containing foam covered the garbage effectively without too much running. Even after four days exposed at room temperature none of the polystyrene chips were exposed. The clay foam dried to a lightweight and smooth cover without any foam collapse. The surface of the foam cover did not show any discoloration or bacteria growth for several months.

EXAMPLE 25

A Firefighting or Fireproofing Foam

The following setup was used to test the effectiveness as a fire barrier of foams according to the present invention. A thin (0.5 cm thick) layer of gasoline was poured into a metal pail that was half-filled with water, a brick was positioned at the center of the pail and it was half-immersed in the water. Three identical pieces of short wooden sticks with a dimension of 5×1.3×1.3 cm were laid on top of the brick. The gasoline layer was then set on fire, and the time it took before the wood chips caught on fire was recorded.

In testing the foam of the present invention as fire barrier, the setup was similar to the one just described except the three wood chips were covered with a 2.5 cm thick layer of a clay-containing foam within the scope of this invention. The clay foam was prepared by adding two parts (by weight) of ammonium stearate to a preformed foam containing 100 parts of water, 30 parts of Barden clay, and two parts of Arquad T, in accordance with the procedure of Examples 1–3.

In the fire barrier test, the wood chips without foam cover caught fire in three minutes and the chips burned completely. In the test wherein the chips were covered with the clay foam of this invention, the foam did not show any foam collapse even after all the gasoline was consumed (which took eight minutes). At the end of the test the powdery clay foam was removed and all the three pieces of wood chips had no sign of being burned or charred.

EXAMPLE 26

A Ceramic Foam Composition

A clay foam was prepared by adding, according to the procedure of Examples 1–3, two parts (by weight) of ammonium stearate to a preformed foam containing 100 parts (by weight) of water, 30 parts of Barden clay, and one part Triton X-405. After thorough mixing, 2.5 parts of Arquad T was added to the foam mixture. The final foam mix was thick and creamy with a wet density of 0.13 g/cc. After drying at room temperature for one week, the clay foam was subjected to the following heating procedure in a kiln: (1) it was heated from room temperature to 800° F. in three hours, (2) it was cooled to room temperature, (3) it was re-heated to 2200° F., and (4) it was cooled to room temperature. The resulting ceramic foam had a linear shrinkage of 12% and a final density of 0.05 g/cc, and most of the pores are closed with average pore diameter less than 1 mm.

EXAMPLE 27

Very Low Density Cementitious Foam As Landfill Materials

The foam composition of the present invention allows very stable and low density (<0.15 g/cc) cementitious foam to be made. Such foam may be used as economical landfill cover materials. A low density cementitious foam was prepared by mixing (1) 50 parts (by weight) of white Portland cement Type I and 25 parts of water, with (2) a foam mixture prepared by the procedure of Examples 1-3 containing a Component One of 100 parts (by weight) of water, 25 parts of Airflex 500 latex, 7.5 parts Arquad T, 0.63 parts of Triton X-405, and a Component Two having four parts of ammonium stearate. The cementitious foam thus made had a dry density of 0.09 g/cc, with no foam collapse, and water droplets would not penetrate the foam barrier readily.

Although illustrated and described herein with reference to certain specific examples, the present invention is nevertheless not intended to be limited to the details shown. Rather, various modifications may be made in the details within the scope and range of equivalents of the claims and without departing from the spirit of the invention.

What is claimed:

1. A composition for use in making a foamed composition comprising:

a long-chain organic cation-forming compound having the formula (I):

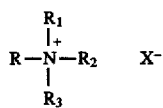

where R is an aliphatic hydrocarbon radical having from 8 to 24 carbon atoms; $R_1$ is selected from the group consisting of an alkyl group having from 1-16 carbon atoms, a benzyl group, and a group which, when taken together with the nitrogen, represents a heterocyclic radical; $R_2$ and $R_3$ are each an alkyl group having from 1-6 carbon atoms; and $X^-$ is selected from the group consisting of a halide, a sulfonate, and a sulfate; and a long-chain organic anion-forming compound having the formula (II):

$$R'—X_2^-Y^+ \qquad (II)$$

where R' is an aliphatic hydrocarbon radical with 10 to 24 carbon atoms; $X_2^-$ is an anionic group selected from the group consisting of carboxylate, sulfate, sulfonate, and phosphate; and $Y^+$ is a cationic counter ion selected from the group consisting of ammonium, sodium, and potassium salt;

wherein the cation formed from said long-chain organic cation-forming compound and the anion formed from said long-chain organic anion-forming compound are present in a weight ratio of from 0.05:1 to 15:1.

2. The composition of claim 1 wherein said long-chain organic cation-forming compound is a salt of long-chain alkyltrimethyl ammonium cation with the alkyl group having 10 to 22 carbon atoms.

3. The composition of claim 2 wherein said long-chain organic cation-forming compound is selected from the group consisting of dodecyltrimethylammonium bromide (or chloride), tetradecyltrimethylammonium bromide (or chloride), hexadecyltrimethylammonium bromide (or chloride), octadecyltrimethylammonium bromide (or chloride), cetyltrimethylammonium bromide (or chloride), cetylbenzyldimethylammonium chloride, cetyltriethylammonium bromide; and mixtures thereof.

4. The composition of claim 1 wherein said long-chain organic anion-forming compound is a salt of a fatty acid containing principally 10 to 24 carbon atoms.

5. The composition of claim 4 wherein said long-chain organic anion-forming compound is selected from the group consisting of ammonium stearate, potassium stearate, and sodium stearate.

6. The composition of claim 1 wherein said weight ratio is from 0.2:1 to 5:1.

7. The composition of claim 1 wherein said weight ratio is from 0.4:1 to 2.5:1.

8. The composition of claim 1 further comprising an additive selected from the group consisting of a water-dispersible polymeric species with a glass transition temperature from −85° C. to +80° C., a water-soluble polymeric species with a glass transition temperature from −85° C. to +80° C., a foaming agent, a sizing agent, a pigment, a dye, and a thickener.

9. The composition of claim 1 further comprising a filler selected from the group consisting of clay and calcium carbonate.

10. The composition of claim 1 further comprising a substance selected from the group consisting of cement, concrete, gypsum, sand, polymeric cement binder, fiber, mineral wool, scrim, cement accelerators and retarders, inert fillers, aggregates, clay, pigments, dyes, plasticizers, superplasticizers, and freeze-preventing additives.

11. A process of preparing a foam comprising the steps of:
(a) generating a preformed foam by agitating a first liquid comprising water and one of
(i) a long-chain organic cation-forming compound having the formula I:

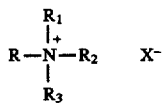

where R is an aliphatic hydrocarbon radical having from 8 to 24 carbon atoms; $R_1$ is selected from the group consisting of an alkyl group having from 1-16 carbon atoms, a hydroxyalkyl group having from 1-16 carbon atoms, a benzyl group, and a group which, when taken together with the nitrogen, represents a heterocyclic radical, and any of said groups having a hydrogen atom replaced by a fluorine atom; $R_2$ and $R_3$ are each selected from the group consisting of an alkyl group having from 1-6 carbon atoms, a hydroxyalkyl group having from 1-6 carbon atoms, a benzyl group, a hydrogen atom, a group which, when taken together with the nitrogen, represents a heterocyclic radical, and any of said groups having a hydrogen atom replaced by a fluorine atom; and $X^-$ is selected from the group consisting of a halide, a sulfonate, and a sulfate; and (ii) a long-chain organic anion-forming compound having the formula (II):

$$R'—X_2^-Y^+ \quad (II)$$

where R' is an aliphatic hydrocarbon radical with 10 to 24 carbon atoms; $X_2^{31}$ is an anionic group selected from the group consisting of carboxylate, sulfate, sulfonate, and phosphate; and $Y^+$ is a cationic counter ion selected from the group consisting of ammonium, sodium, and potassium salt;

(b) adding to said preformed foam a second liquid comprising the other of said long-chain organic cation-forming compound and said long-chain organic anion-forming compound, such that the cation formed from said long-chain organic cation-forming compound and the anion formed from said long-chain organic anion-forming compound are present in a weight ratio of from 0.05:1 to 15:1; and (c) agitating said preformed foam and said second liquid to generate a single foam from said preformed foam and said second liquid.

12. The process of claim 11 further comprising the step of dispersing into said single foam a slurry containing a substance selected from the group consisting of cement, concrete, gypsum, sand, polymeric cement binder, fiber, mineral wool, scrim, cement accelerators and retarders, inert fillers, aggregates, clay, pigments, dyes, plasticizers, superplasticizers, and freeze-preventing additives.

13. The process of claim 11 wherein the cation formed from said long-chain organic cation-forming compound and the anion formed from said long-chain organic anion-forming compound are present in a weight ratio of from 0.2:1 to 5:1.

14. A process of preparing a foam comprising the steps of:

(a) forming a liquid mixture in water of a long-chain organic cation-forming compound having the formula (I):

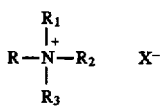

where R is an aliphatic hydrocarbon radical having from 8 to 24 carbon atoms; $R_1$ is selected from the group consisting of an alkyl group having from 1–16 carbon atoms, a benzyl group, and a group which, when taken together with the nitrogen, represents a heterocyclic radical; $R_2$ and $R_3$ are each an alkyl group having from 1–6 carbon atoms; and $X^-$ is selected from the group consisting of a halide, a sulfonate, and a sulfate; and a long-chain organic anion-forming compound having the formula (II):

$$R'—X_2^-Y^+ \quad (II)$$

where R' is an aliphatic hydrocarbon radical with 10 to 24 carbon atoms; $X_2^-$ is an anionic group selected from the group consisting of carboxylate, sulfate, sulfonate, and phosphate; and $Y^+$ is a cationic counter ion selected from the group consisting of ammonium, sodium, and potassium salt;

such that the cation formed from said long-chain organic cation-forming compound and the anion formed from said long-chain organic anion-forming compound are present in said liquid mixture in a weight ratio of from 0.05:1 to 15:1;

(b) adding to said liquid mixture a foam generator; and (c) agitating said mixture.

15. The process of claim 14 wherein the cation formed from said long-chain organic cation-forming compound and the anion formed from said long-chain organic anion-forming compound are present in a weight ratio of from 0.2:1 to 5:1.

16. A coating formed from the composition of claim 8.
17. An ink formed from the composition of claim 8.
18. An adhesive formed from the composition of claim 8.
19. A cementitious object formed from the composition of claim 10, wherein said cementitious object is selected from the group consisting of a block, panel, board, roofdeck, and flooring.
20. A gypsum object formed from the composition of claim 10, wherein said gypsum object is selected from the group consisting of a board, panel, roofdeck, and flooring.
21. A barrier material formed from the composition of claim 1, wherein said barrier material is selected from the group consisting of a landfill cover, an odor barrier, and a dust cover.
22. A paper treating product formed from the composition of claim 8.
23. A textile treating product formed from the composition of claim 8.
24. A wood treating product formed from the composition of claim 8.
25. A ceramic product formed from the composition of claim 10.
26. A firefighting foam formed from the composition of claim 10.
27. A fireproofing foam formed from the composition of claim 10.
28. A void fill formed from the composition of claim 10, wherein said void fill is selected from the group consisting of a geofill, a soil stabilizer, an oil well fill, and a tunnel fill.
29. A foam composition comprising:

(a) water;

(b) a long-chain organic cation formed from a cation-forming compound having the formula (I):

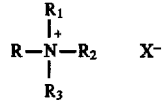

where R is an aliphatic hydrocarbon radical having from 8 to 24 carbon atoms; $R_1$ is selected from the group consisting of an alkyl group having from 1–16 carbon atoms, a benzyl group, and a group which, when taken together with the nitrogen, represents a heterocyclic radical; $R_2$ and $R_3$ are each an alkyl group having from 1–6 carbon atoms; and $X^-$ is selected from the group consisting of a halide, a sulfonate, and a sulfate; and (c) a long-chain organic anion formed from an anion-forming compound having the formula (H):

$$R'—X_2^-Y^+ \quad (II)$$

where R' is an aliphatic hydrocarbon radical with 10 to 24 carbon atoms; $X_2^-$ is an anionic group selected from the group consisting of carboxylate, sulfate, sulfonate, and phosphate; and $Y^+$ is a cationic counter ion selected from the group consisting of ammonium, sodium, and potassium salt;

wherein said long-chain organic cation and said long-chain organic anion are present in a weight ratio of from 0.05:1 to 15:1.

30. A foam composition as claimed in claim 29 further comprising a foam generator.

31. A precast or cast-in place cementitious object comprising a foam formed from the composition of claim 8, wherein said cementitious object is selected from the group consisting of a paving or building block, panel, board, roofdeck, flooring and ground cover for roads and runways.

32. A gypsum object comprising a foam formed from the composition of claim 8, wherein said gypsum object is selected from the group consisting of a board, panel, roofdeck, and flooring.

33. The composition of claim 1 wherein said foamed composition is aqueous and at least one of said long-chain organic cation-forming compound and said long-chain organic anion-forming compound is a preformed foam.

* * * * *